United States Patent
Moreaux et al.

(10) Patent No.: US 7,472,274 B2
(45) Date of Patent: Dec. 30, 2008

(54) AUTHENTICATION OF AN ELECTRONIC TAG

(75) Inventors: Christophe Moreaux, Eguilles (FR); Claude Anguille, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 747 days.

(21) Appl. No.: 10/459,908

(22) Filed: Jun. 12, 2003

(65) Prior Publication Data

US 2003/0233548 A1 Dec. 18, 2003

(30) Foreign Application Priority Data

Jun. 13, 2002 (FR) .................................. 02 07298

(51) Int. Cl.
*H04L 9/00* (2006.01)
*G06F 12/14* (2006.01)
*G08B 29/00* (2006.01)

(52) U.S. Cl. ......................... 713/168; 726/34; 713/189

(58) Field of Classification Search ................. 713/168, 713/189; 726/34
See application file for complete search history.

(56) References Cited

U.S. PATENT DOCUMENTS

| | | | |
|---|---|---|---|
| 4,302,810 A | | 11/1981 | Bouricius et al. |
| 5,649,099 A | * | 7/1997 | Theimer et al. .................. 726/4 |
| 6,092,191 A | * | 7/2000 | Shimbo et al. .............. 713/153 |
| 6,105,862 A | | 8/2000 | Pailles et al. |
| 6,651,167 B1 | * | 11/2003 | Terao et al. .................. 713/168 |
| 6,965,994 B1 | * | 11/2005 | Brownell et al. ............. 713/156 |
| 6,996,543 B1 | * | 2/2006 | Coppersmith et al. ......... 705/50 |
| 7,076,658 B2 | * | 7/2006 | O Neill ....................... 713/176 |
| 7,182,257 B2 | * | 2/2007 | Ogihara et al. .............. 235/385 |
| 2002/0129250 A1 | * | 9/2002 | Kimura ....................... 713/172 |

FOREIGN PATENT DOCUMENTS

| | | | |
|---|---|---|---|
| EP | 817420 A2 | * | 1/1998 |
| FR | 2 796 788 A1 | | 1/2001 |

OTHER PUBLICATIONS

Bellare, Mark et al., "XOR MACS: New Methods for Message Authentication Using Finite Pseudorandom Functions," Crypto '95, LNCS 963, 1995, pp. 15-28.*
French Search Report from French Patent Application 02/07298, filed Jun. 13, 2002.

* cited by examiner

*Primary Examiner*—Emmanuel L Moise
*Assistant Examiner*—Michael Pyzocha
(74) *Attorney, Agent, or Firm*—Lisa K. Jorgenson; James H. Morris; Wolf, Greenfield & Sacks, P.C.

(57) ABSTRACT

A method and a system for authenticating an electronic tag by a host communicating with this tag via a reader, including: calculating, on the tag side, a first digital signature using at least one first function shared by the tag and the reader, taking into account at least one first secret key known by the electronic tag and the reader only; transmitting the first signature to the reader; calculating, on the reader side, a second digital signal using at least one second function, different from the first function and shared by the reader and the host, taking the first signature into account; transmitting the second signature to the host; and checking, on the host side, the coherence between the second signature and a validation value calculated based on said second function and on a second secret key known by the host and by a single element selected from among the tag and the reader.

6 Claims, 2 Drawing Sheets

AUTHENTICATION OF AN ELECTRONIC TAG

BACKGROUND OF THE INVENTION

1. Field of the Invention

The present invention generally relates to systems of authentication of an integrated circuit supported by a distant element (for example, an electronic tag to be placed on any product). The present invention more specifically relates to systems which require, for an authentication, three distinct elements, that is, the integrated circuit to be authenticated, a reader of information contained in the circuit, and a host communicating with the reader.

2. Discussion of the Related Art

An example of application of the present invention concerns the marking by radiofrequency tag of distribution system consumables. For example, these may be "coffee machine" refills or printer cartridges. The authentication is then used to guarantee that only cartridges authorized by the manufacturer are used by a given printer. In such an application, the integrated circuit to be authenticated is supported by the printer cartridge in the form of an electronic tag capable of communicating, in a contactless and wireless manner, with a reader, such as an electromagnetic transponder. The reader is connected to the host by means of a connection of another type, for example, an electric interface of type I2C or the like.

"Application" will be used hereafter to designate all the tasks performed by the system (for example, the printer) once the tag has been authenticated.

For the application to operate properly, the electronic tag must previously have been authenticated to make sure that the product (for example, a cartridge or a refill) which supports it is an authorized product (for example, to make sure that the merchandise marked by the tag has not been replaced by an imitation).

The function of the host (formed, for example, of a microcontroller, of a distant computer or of any other adapted electronic system) is to control the application, that is, the authentication program as well as the appropriate actions following the detection (for example, blocking of the printer or of the coffee machine in a no-authentication case). In these fields, the host will preferentially be a microcontroller equipping the automatic vending machine or the printer. It may however also be a distant host communicating, for example, by telephone connection or by dedicated line, with different readers.

The communication between the host and the reader is based on accessible widespread protocols to enable use of different readers with the same host equipped with the application controller. However, this generates a weakness in terms of security, especially if the host is distant from the reader (even slightly, while being in the same device). The final tag authentication decision to allow correct execution of the application belongs to the host.

Known authentication systems use cryptography algorithms to authenticate an electronic tag based on a specific secret key. For example, algorithms of DES type (Data Encryption Standard) are used.

A disadvantage of such cryptography algorithms is that they require an electronic tag provided with high-performance calculation means, in the case in point, generally a microprocessor. The cost generated by such calculation means makes these systems poorly adapted to refills or goods of consumable type for which the cost of the electronic tag is desired to be minimized due to the fact that said tag is short-lived.

SUMMARY OF THE INVENTION

The present invention will be described hereafter in relation with a specific example of radiofrequency transmission between the integrated circuit to be authenticated and its reader. It should however be noted that it more generally applies to any authentication system involving three distinct elements (an electronic tag to be authenticated, a reader, and a host) and where the communication between the reader and the host is performed by different means than the communication between the tag and the reader.

The present invention aims at providing a novel method and system for authenticating an electronic device in a system comprising at least this device to be authenticated, a reader of the device and a host in charge of controlling the execution of an application according to the device authentication.

The present invention more specifically aims at providing a solution adapted to electronic tags or the like of small size and cost, in particular, without requiring use of a microprocessor in the tag.

The present invention also aims at enabling authentication while the communication between the reader and the host is performed on a link unprotected against possible piracies.

According to a first aspect, the present invention provides electronic tags all having a same secret key for tags of the same type.

According to a second aspect, the present invention provides individualizing the secret key at the level of each electronic tag.

To achieve these and other objects, the present invention provides a method for authenticating an electronic tag by a host communicating with this tag via a reader, comprising:

calculating, on the tag side, a first digital signature by means of at least one first function shared by the tag and the reader, taking into account at least one first secret key known by the electronic tag and the reader only;

transmitting the first signature to the reader;

calculating, on the reader side, a second digital signal by means of at least one second function, different from the first function and shared by the reader and the host, taking the first signature into account;

transmitting the second signature to the host; and checking, on the host side, the coherence between the second signature and a validation value calculated based on said second function and on a second secret key known by the host and by a single element selected from among the tag and the reader.

According to an embodiment of the present invention, the second secret key is known by the reader and the host only, this second key being taken into account in the calculation, by the reader, of the second signature transmitted to the host.

According to an embodiment of the present invention, the second secret key is known by the electronic tag and the host only and is stored in the tag upon first use associated with the host.

According to an embodiment of the present invention, a third key known by the reader and the host only is used for the calculations of the second signature and of the validation value.

According to an embodiment of the present invention, the authentication method comprises the successive steps of:

extracting from the electronic tag data to be transmitted to the host;

transmitting these data to the host via the reader, while storing these data on the host side and on the reader side;

generating, on the host side, a random or pseudo-random number and transmitting it to the tag via the reader, while storing this number on the host side, on the reader side, and on the tag side;

calculating, on the electronic tag side, an intermediary signature by application of said first function with as operands said number, said data and said first secret key; and on the reader side, calculating an intermediary value by application of the first function with as operands said number, said data, and said first secret key.

According to an embodiment of the present invention, said intermediary value forms said first signature, and the method comprises, on the reader side, the steps of:

comparing said first signature to said intermediary value calculated by the reader; and calculating said second signature by taking into account said number, said data, said second secret key and the result of the preceding comparison.

According to an embodiment of the present invention, the calculation of the second signature comprises using the second function or a third function according to the result of said comparison.

According to an embodiment of the present invention, the calculation of the second signature comprises using the second function with, as operands, said number, said data, said second secret key, and the result of said comparison.

According to an embodiment of the present invention, the method comprises the steps of:

on the electronic tag side, calculating a first combination of XOR type of said intermediary signature with said second secret key, to obtain said first signature to be transmitted to the reader; and on the reader side:

calculating a second combination of XOR type of the first received signature with said intermediary value; and calculating said second signature by application of said second function with as operands the result of the second combination, said number and said data.

According to an embodiment of the present invention, said second function is a function of generation of a pseudo-random number, common to the reader and to the host.

According to an embodiment of the present invention, said pseudo-random generation function uses as seeds said data, said number and, respectively on the reader side and on the host side, said second combination of XOR type and said second secret key.

According to an embodiment of the present invention, said electronic tag is an electromagnetic transponder.

The present invention also provides an electronic tag, comprising an integrated circuit and means for storing a first secret key and for executing a first algorithmic function.

The present invention also provides an electronic tag reader.

According to an embodiment of the present invention, the reader comprises a pseudo-random generator capable of providing said second signature.

The present invention further provides a microcontroller of authentication of an electronic tag.

According to an embodiment of the present invention, the microcontroller comprises a pseudo-random generator capable of providing said validation value.

The foregoing objects, features and advantages of the present invention will be discussed in detail in the following non-limiting description of specific embodiments in connection with the accompanying drawings.

DETAILED DESCRIPTION

Figures 1, 2:
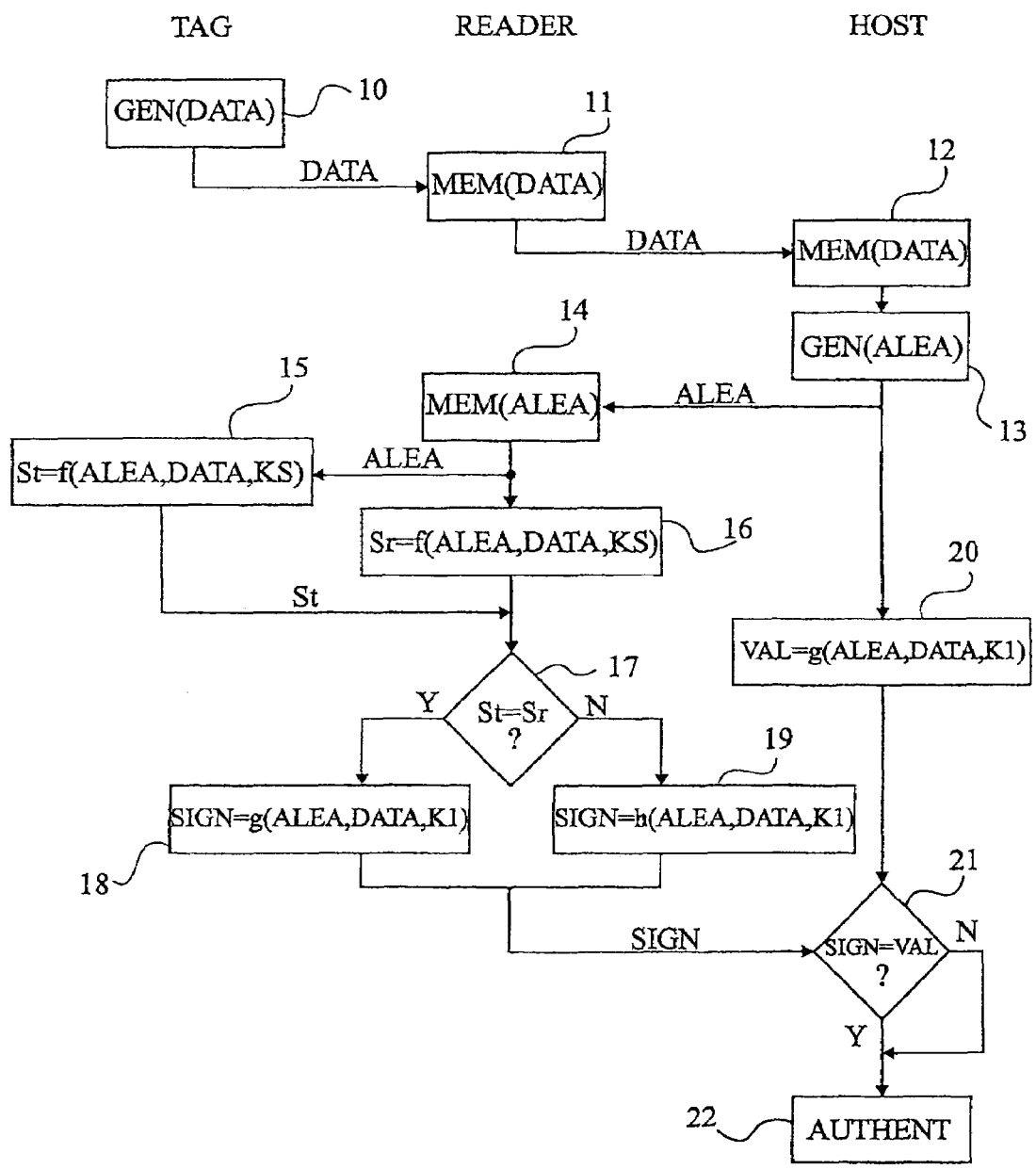
FIG. 1 very schematically shows in the form of blocks a system exploiting an electronic tag according to an embodiment of the first aspect of the present invention.
FIG. 2 is a flowchart of an embodiment of the present invention according to its first aspect.

The same system elements and method steps have been designated with same references in the different drawings. For clarity, only those method steps and those system components which are necessary to the understanding of the present invention have been shown in the drawings and will be described hereafter. In particular, the means used to perform the actual transmissions between the integrated circuit of the tag and its reader and between the reader and the host have not been detailed. The present invention applies whatever the transmission protocol used to convey the data and information implemented by the present invention.

FIG. 1 very schematically shows in the form of blocks a system of the type to which the present invention applies according to this first aspect. An electronic tag 1 (TAG) belonging for example to the family of electromagnetic transponders is carried by a product (not shown) which is desired to be authenticated. In the case of a tag of electromagnetic transponder type, said tag can communicate in a contactless and wireless manner (radiofrequency link 2) with a reader 3 (READER) or radiofrequency coupler, a conventional function of which is to be used as an electric interface between electronic tag 1 and a host 4 in charge of executing the application once the electronic tag has been authenticated. Reader or coupler 3 communicates with host 4, for example, by a wire connection 5.

In an example of application to ink cartridges for printers, tag 1 is formed of an integrated circuit chip attached to (for example, glued) or comprised in the ink cartridge package. Reader 3 is formed of a radiofrequency coupler equipping the printer and which communicates with a microcontroller formed by host 4. Host 4 is, for example, comprised in the printer control circuits or placed in a computer to which said printer is connected.

The cartridge authentication is especially used to prevent piracy of connection 5, which would result in having the printer accept any cartridge. According to the present invention, an authentication phase is provided between tag 1 and reader 3, followed by a transmission of this authentication to host 4.

According to the present invention, the transmission of the authentication from reader 3 to host 4 is performed according to a secured procedure which will be described hereafter in relation with FIG. 2.

To implement the present invention according to its first aspect illustrated in FIGS. 1 and 2, electronic tag 1 and reader 3 comprise or integrate a secret key KS known by both of them. According to this first aspect, reader 3 is dedicated to a type of tag 1 (for example, a printer cartridge type).

As illustrated in FIG. 1, tag 1 and reader 3 also have a common cyphering function f, as will be seen hereafter in relation with FIG. 2.

Reader 3 and microcontroller 4 each comprise or integrate a common key K1 as well as a cyphering function g. According to this embodiment, reader 3 also contains a no-authentication coding function h.

A feature of the present invention is to differentiate, in the transmission between reader 3 and host 4, the implemented coding or cyphering function according to whether the authentication performed by reader 3 is positive or not. Thus, there is more than transmitting to host 4 that the authentication is correct and not transmitting anything in the absence of an authentication. Something is always transmitted, but host 4 only interprets it if it is a positive authentication.

What is illustrated in FIG. 1 by a function differentiation (g and h) must be understood either as a differentiation of the function coding a same result datum as will be discussed hereafter in relation with FIG. 2, or as a same function coding two different data according to the authentication result.

The transmission between reader 3 and host 4 is independent from the transmission between tag 1 and reader 3, in that host 4 ignores both key KS shared between the reader and the tag, and cyphering function f implemented in the transmission between these two elements.

FIG. 2 illustrates in the form of a flowchart an implementation mode of the present invention according to its first aspect. In FIG. 2, the method steps illustrated by the flowchart have been distributed in three columns TAG, READER, and HOST according to whether they are performed by the electronic tag, by the reader or by the host.

The first step (block 10, GEN(DATA)) of the authentication method of the present invention comprises generation, by the electronic tag (TAG), of a data message DATA to be transmitted for authentication. Message DATA contains, for example, an identifier of the product carrying the electronic tag (for example, the ink cartridge serial number and!or type). The generation of this identifier by the electronic tag is, for example and conventionally, caused by the supplying of the tag when it enters the field of reader 3. The operation of a tag of electromagnetic transponder type is perfectly well known. Briefly, the supply of the tag's integrated circuit (or a specific control signal received from the reader) causes the transmission, by back modulation of the remote supply carrier, of message DATA.

When it receives the data, the reader which comprises a back-modulator adapted to the transponder type, stores (block 11, MEM(DATA)) the transmitted message. Further, the reader communicates the data to host 4 which itself stores them (block 12, MEM(DATA)).

The above-described transmission does not form a proper authentication. It is only the transmission of an identifier of the electronic tag to the host (HOST). Before allowing the application to carry on, the host must make sure that the tag belongs to an authentic product. It thus initiates the actual authentication procedure.

According to the present invention, the host generates (block 13, GEN(ALEA)) a random or pseudo-random number ALEA that it stores and communicates to reader 3. Reader 3 stores (block 14, MEM(ALEA)) number ALEA and transmits it to electronic tag 1.

The integrated circuit of tag 1 then calculates (block 15, St=f(ALEA, DATA, KS)) a first signature St by using algorithmic function f and as operands variables ALEA, DATA and KS. In other words, the electronic tag calculates its signature St that it transmits to reader 3.

In parallel (or after having received signature St from tag 1), reader 3 calculates (block 16, Sr=f(ALEA, DATA, KS)) a variable Sr by applying the same algorithmic function f to the data ALEA, DATA and KS that it contains. The function of key KS and of function f common to tag 1 and to reader 3 thus appears, which is to enable cyphered authentication of the tag by the reader.

Reader 3 then performs a coherence test (block 17, St=Sr?) between variable Sr that it has calculated and signature St transmitted by the electronic tag.

At this stage of the authentication method, the present invention typically provides not transmitting the authentication result (Y or N) in clear (that is, visibly) to the host. According to the present invention, the authentication is cyphered, be it positive or negative.

In the example shown, the reader calculates a second signature SIGN which is different according to the result of test 17. If test 17 has validated (Y) the authentication of tag 1, signature SIGN is calculated (block 18, SIGN=g(ALEA, DATA, K1)) by applying algorithmic function g to variables ALEA, DATA, and K1. In case of a negative authentication, reader 3 calculates (block 19, SIGN=h(ALEA, DATA, K1)) signature SIGN by applying function h to the same variables.

Signature SIGN thus calculated is then transmitted to the host exploiting the authentication. The host calculates (block 20, VAL=g(ALEA, DATA, K1)) previously or after reception of signature SIGN, a validation value VAL corresponding to the application of function g to variables ALEA, DATA and K1 that it knows. The function of secret key K1, known by the reader and by the microcontroller and of the function g that they share, here becomes apparent.

The host compares (block 21, SIGN=VAL?) the signature SIGN received from the reader with the validation value that it has calculated. Result Y or N of this test authenticates or not electronic tag 1.

This result is then exploited (block 22, AUTHENT) by the conventional procedures which follow an authentication, which are not per se an object of the present invention.

An advantage of the present invention is that coding as the positive authentication as well as the negative authentication on the side of reader 3 prevents a pirate from taking advantage of a spying of the communications over link 5 (FIG. 1). Indeed, he will observe a message in all cases, whether the authentication is positive or not.

Another advantage of the present invention is that the authentication implemented between the reader and the electronic tag is independent from the host, more specifically, from microcontroller 4, exploiting the results of the authentication and controlling the application progress.

The transmitted data may be of any kind provided that they enable implementation of the described authentication method. For example, data word DATA is formed of a portion of fixed data linked to the tag and of a portion of variable data. The fixed data portion is, for example, a single number specific to each tag. The variable part corresponds, for example, to the result of a decremental counter counting the number of applications performed. Such an embodiment ensures that in normal use, there cannot be several authentications with the same data, which improves the system reliability.

Random number ALEA generated by the host may be a pseudo-random number using the data as a seed. For example, this pseudo-random number may use a portion of the data as a seed. For example, the value of the current state at the output of the pseudorandom generator may be saved upon turning-off of the system, to use this value as a seed for the next use.

However, ideally, the seed originates from an "analog" variable, for example, a thermal noise in a resistor.

Figure 3:
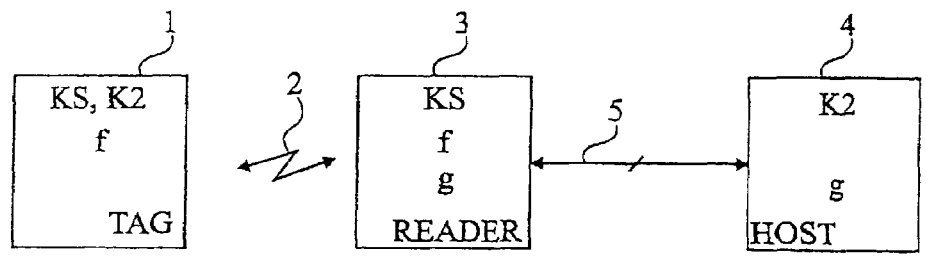
FIG. 3 very schematically shows in the form of blocks a system exploiting an electronic tag according to an embodiment of the second aspect of the present invention.

FIG. 3 very schematically shows in the form of blocks a system with an electronic tag, a reader, and a host according to the second aspect of the present invention. This drawing should be compared with FIG. 1 and only the differences with respect to FIG. 1 will be discussed.

According to this second aspect of the present invention, it is desired to individualize keys KS contained in each of the electronic tags, and thus in each of the products to be identified. Such an individualization requires for these keys to be written into the electronic tags, for example and preferentially upon first use of the product carrying them.

Thus, in the embodiment illustrated in FIG. 3, electronic tag 1 and reader 3 share key KS and function f as in the preceding embodiment. A difference with respect to this preceding embodiment is that reader 3 and host 4 only share function g. Further, tag 1 and host 4 share, as for them, a second key K2 which is written into the electronic tag upon its first use associated with host 4.

In the example of application to printer cartridges, this amounts to saying that, upon placing of a new cartridge in a given printer, the microcontroller associated with this printer will provide to the electronic tag of the cartridge a key K2, preferably randomly generated, and stored in the electronic tag.

Upon authentication of this electronic tag, for example, for each use, the method starts like the method discussed in relation with FIG. 2 until step 15 of calculation of an intermediary signature St on the electronic tag side.

Figure 4:
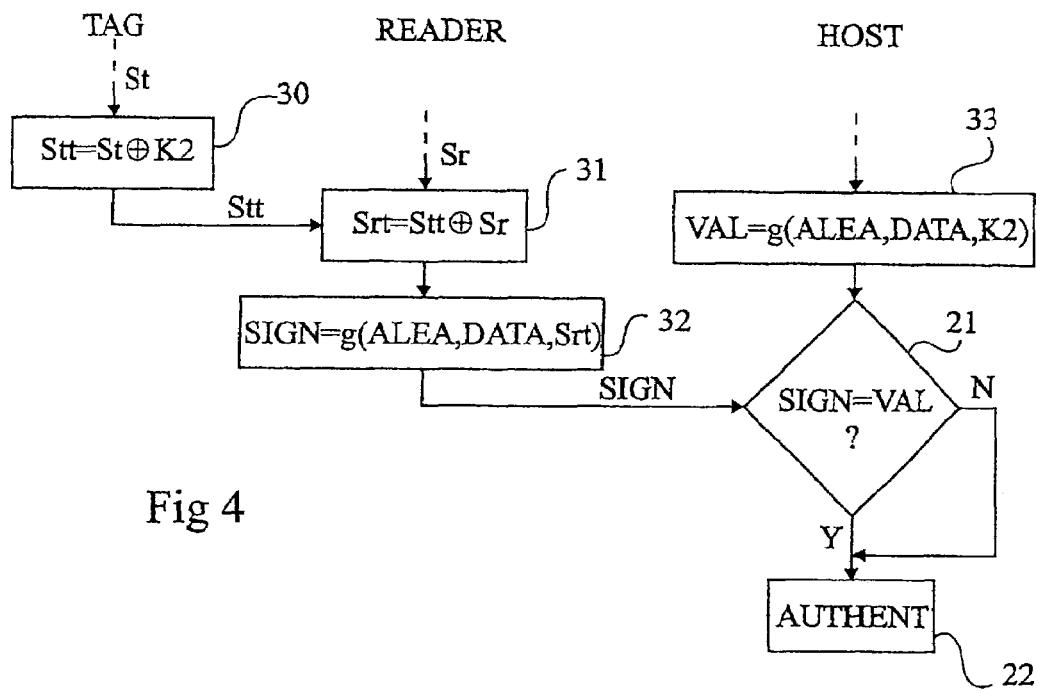
FIG. 4 is a partial flowchart illustrating an embodiment of the present invention according to its second aspect.

FIG. 4 shows the rest of the authentication method according to an embodiment of this second aspect of the present invention. On the side of tag 1 (TAG), the initial data thus form intermediary signature St (St=f(ALEA, DATA, KS)). As for reader 3 (READER), it has calculated a corresponding intermediary value Sr (Sr=f(ALEA, DATA, KS)).

According to this second embodiment, the electronic tag calculates (block 30, Stt=St+K2) the first signature Stt as corresponding to an XOR-type combination of intermediary signature St with key K2. Signature Stt, cyphered by key K2, is transmitted to reader 3. On its side, reader 3 calculates (block 31, Srt=Stt+Sr) an XOR-type combination Srt of first signature Stt with intermediary value Sr that it has previously calculated. If the tag is authentic (that is, it contains the right keys KS and K2 and the right function f), combination Srt is equal to key K2 (Sr=St). Combination Srt is used by reader 3 to calculate (block 32, SIGN=g(ALEA, DATA, Srt)) the second signature SIGN by applying function g to operands ALEA, DATA and Srt. Signature SIGN is then transmitted to host 4 (HOST).

Another difference with respect to the first embodiment should here be noted, which is that the reader does not strictly speaking have a negative authentication function (function h, FIGS. 1 and 2). The differentiation between an authentication and no authentication here results from the taking into account of variable Srt in the application of function g. This alternative, which is necessary in the embodiment of FIG. 4, may be alternatively implemented in the embodiment of FIG. 2 by using as operand for function g the positive or negative result of the testing of block 17.

Returning to the embodiment of FIG. 4, the host checks the authenticity of electronic tag 1 by comparing (block 31, SIGN=VAL?) signature SIGN received from reader 3 with a validation value VAL calculated (block 33, VAL=g(ALEA, DATA, K2)) by applying function g to variables ALEA, DATA, and K2. If values SIGN and VAL are identical, this means that the electronic tag does have not only function f of reader 3, but also key K2 written by host 4 in tag 1 at its first use. In the opposite case, host 4 may implement the no authentication procedures.

An advantage of this embodiment is that it does not require, on the side of electronic tag 1, storing key K2 from as soon as it has been manufactured. This enables individualizing the products to be authenticated at the time of their first use by a given device.

Another advantage of this embodiment is that if function g is broken, that is, discovered by a pirate, despite the precautions that have been taken, the product carrying electronic tag 1 will however not be usable on another device (more specifically, with another microcontroller 4) since key K2 will then be unknown of the other device.

The constraint to be respected to implement the present invention according to its second aspect is the use of an XOR-type function in the combination functions (blocks 30 and 31).

Of course, the embodiments of FIGS. 1, 2 and 3, 4, may be combined. In this case, variables SIGN (block 32, FIG. 4) and VAL (block 33, FIG. 4) are also a function of key K1, known by the reader and by the host only, which is then considered as a third key.

Figure 5:
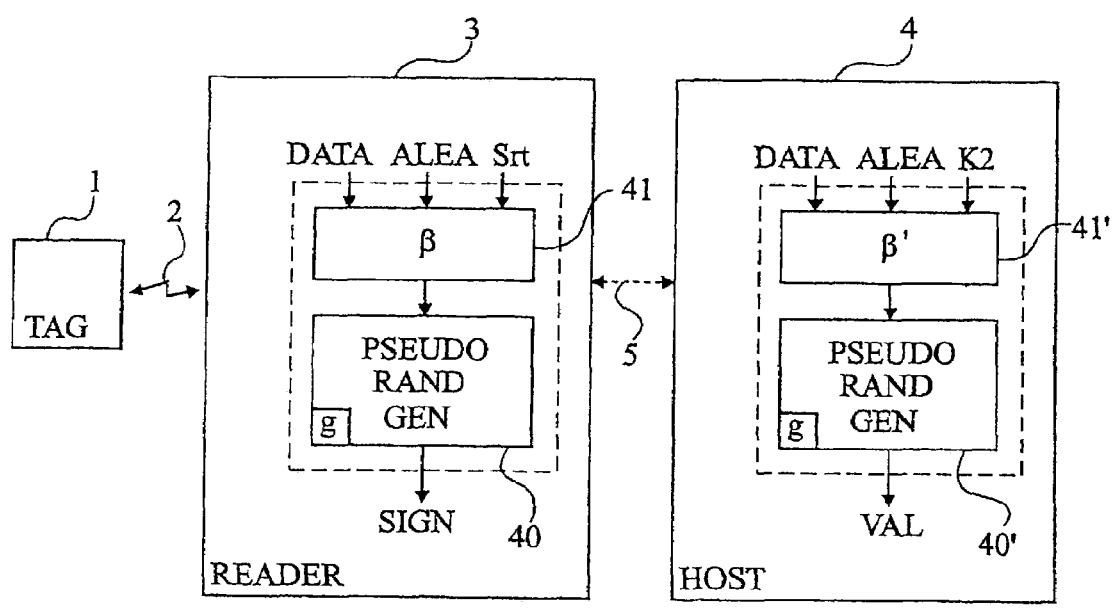
FIG. 5 very schematically shows in the form of blocks an embodiment of a system according to the present invention to implement a preferred authentication function.

FIG. 5 illustrates a preferred embodiment of a coding or cyphering function (g) between a reader and a host according to the present invention. FIG. 5 should be compared with FIGS. 1 and 3 in that it schematically represents in the form of blocks an electronic tag 1, a reader 3, and a host 4.

According to this embodiment, reader 3 and host 4 each comprise a pseudorandom generator (PSEUDO RAND GEN) 40, respectively 40', corresponding to function g. Both generators 40 and 40' are identical in that, for a same seed, they provide a same output value. In other words, the pseudorandom generation functions of the two blocks 40 and 40' are the same.

According to the present invention, generators 40 and 40' respectively provide, on the side of reader 3 and on the side of host 4, variables SIGN and VAL, that is, the values enabling the host to validate the authentication performed by the reader.

In each pseudo-random generator, a seed (B, block 41 and 41') which is a function of different variables used in the authentication method is used.

According to the present invention, on the side of reader 3, seed B takes into account variables DATA, ALEA and Srt (as an alternative, variable Sr in the implementation of FIG. 2). On the side of host 4, seed B' takes into account variables DATA, ALEA, and K2 (as an alternative, variable K1 in the implementation of FIG. 2). Seeds B and B' are, for example, obtained by concatenation of the variables taken into account or by a more complex function.

According to the present invention, the two pseudo-random generators 40 and 40' are thus initialized with a same seed if the authentication is correct.

In the embodiment of FIG. 4, value Srt will be, in case of a negative authentication, different from key K2.

In the embodiment of FIG. 2, if the authentication performed by reader 3 (test 17) is incorrect, generator 40 is initialized with a variable different from that initializing generator 40'. For this purpose, the binary result (0 or 1) of test 17 contributes to seed B. On the host side, the value (for example, 1) arbitrarily chosen to indicate a correct authentication contributes to seed B'. It should be noted that here, function g of reader 3 will be the same whether the authentication is positive or negative.

In all cases, this effectively enables masking the authentication by transmitting both a positive authentication and a negative authentication between the reader and the host.

An advantage of the embodiment of FIG. 5 is that its implementation is particularly inexpensive and simple, while providing optimal security against possible piracies.

The frequency of the authentications depends on the application. For example, for a printer, an authentication may be triggered for each use (for each printing), for each start-up (turning-on), for each detection of a cartridge change and/or periodically. For a beverage machine, the authentication may be implemented after each intervention of replacement of a product refill, conventionally detected.

Of course, the present invention is likely to have various alterations, modifications, and improvements which will readily occur to those skilled in the art. In particular, the choice of the pseudo-random generation functions or more generally of the algorithmic functions implemented in the different exchanges is within the abilities of those skilled in the art based on the functional indications given hereabove, on the application, and on the available conventional algorithmic and generation functions. Further, the sizes (number of bits) of the digital variables used will be chosen, conventionally, especially according to the desired security.

Further, the exploitation of the authentication results may be of any kind according to the application.

Moreover, the authentication processes may be implemented, on the side of reader 3 and on the side of host 4, either by software by means of a microcontroller, or in wired logic. However, on the side of electronic tag 1, it should be noted that the present invention, without excluding a software implementation by a microcontroller, preferentially applies to a wired logic implementation, that is, of an inexpensive tag.

Finally, the electronic tag comprising an integrated circuit for the implementation of the present invention may be an element added on the product (for example, a refill) to be authenticated, or included therein (for example, included in the product package).

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for authenticating an electronic tag by a host communicating with the electronic tag via a reader, the method comprising:

extracting from the electronic tag data to be transmitted to the host;

transmitting the data to the host via the reader, while storing the data on a host side and on a reader side;

generating, on the host side, a random or pseudo-random number and transmitting the random or pseudo-random number to the electronic tag via the reader, while storing the random or pseudo-random number on the host side, on the reader side, and on an electronic tag side;

calculating, on the electronic tag side, an intermediary signature by application of at least one first function shared by the electronic tag and the reader to the random or pseudo-random number, the data and at least one first secret key known by the electronic tag and the reader only;

calculating, on the electronic tag side, a first combination of XOR type of the intermediary signature with a second secret key, to obtain a first digital signature to be transmitted to the reader, wherein the second secret key is known by the electronic tag and the host only;

transmitting the first digital signature to the reader;

calculating, on the reader side, a second combination of XOR type of the received first digital signature with the intermediary value to obtain a result of the second combination;

calculating, on the reader side, a second signature by application of a second function to the result of the second combination, the random or pseudo-random number and the data, wherein the second function is a pseudo-random number generation function, common to the reader and to the host, and wherein the pseudo-random generation function uses as seeds the data, the random or pseudo-random number and, respectively on the reader side and on the host side, the second combination and the second secret key;

transmitting the second signature to the host; and checking, on the host side, a coherence between the second signature and a validation value calculated from the second function and the second secret key.

2. The method of claim 1, wherein the second secret key is stored in the electronic tag upon a first use of the electronic tag with the host.

3. The method of claim 1, wherein the electronic tag is an electromagnetic transponder.

4. An electronic tag, comprising an integrated circuit and means for storing a first secret key and for executing a first algorithmic function that implements the method of claim 1.

5. A reader of an electronic tag, comprising an integrated circuit and means for implementing the method of claim 1.

6. A microcontroller of authentication of an electronic tag, comprising an integrated circuit and means capable of implementing the method of claim 1 when it is desired to authenticate the electronic tag.

* * * * *